(12) United States Patent
Cook et al.

(10) Patent No.: US 6,751,727 B1
(45) Date of Patent: Jun. 15, 2004

(54) NETWORK COMMUNICATION DEVICE IDENTIFICATION IN A COMMUNICATION NETWORK

(75) Inventors: Fred S. Cook, Olathe, KS (US); Randolph Keith Hiser, Overland Park, KS (US); John W. Linebarger, Sr., Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 707 days.

(21) Appl. No.: 09/754,654

(22) Filed: Jan. 4, 2001

(51) Int. Cl.[7] ............................................. G06F 15/177
(52) U.S. Cl. .................... 713/1; 713/2; 709/222
(58) Field of Search ................. 713/1, 2, 100; 709/220, 221, 222, 227, 228, 229, 230

(56) References Cited

U.S. PATENT DOCUMENTS

| | | | | |
|---|---|---|---|---|
| 5,526,489 A | * | 6/1996 | Nilakantan et al. ......... | 709/228 |
| 6,556,541 B1 | * | 4/2003 | Bare ........................... | 370/235 |
| 2002/0035621 A1 | * | 3/2002 | Zintel et al. ................ | 709/220 |
| 2002/0077077 A1 | * | 6/2002 | Rezvani et al. ............. | 455/410 |

* cited by examiner

*Primary Examiner*—Dennis M. Butler

(57) ABSTRACT

An identification system is disclosed that is configured to identify communication devices on a network. The identification system is comprised of boot circuitry and an interface. The boot circuitry receives an identification request to identify communication devices. The boot circuitry scans memory addresses that represent communication paths with the communication devices. The boot circuitry generates identification query signals for each memory address scanned. The interface formats each identification query signal based on communication formats to generate formatted identification signals. The communication formats are based on the communication paths with the communication devices. The interface transmits the formatted identification signals to the communication devices based on the communication formats. The interface receives response signals from each of the communication devices and transfers the response signals to the boot circuitry. The boot circuitry identifies the communication devices based on the response signals. Advantageously, the boot circuitry comprises a BIOS chip, or some other convention boot chip, that is well known and relatively inexpensive.

22 Claims, 4 Drawing Sheets

NETWORK COMMUNICATION DEVICE IDENTIFICATION IN A COMMUNICATION NETWORK

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention is related to the field of communication systems, and in particular, to a method and system for identifying network communication devices on a network.

2. Description of the Prior Art

A communication device may need to identify the other communication devices that it will be communicating with when it is connected to a network. Currently, when a network administrator connects a new communication device to the network, he/she assigns the new communication device an address or some other identifier. The identifiers are generally kept in a central repository that can be accessed by the other communication devices. An example of this technology is the JINI system developed by SUN Microsystems. Unfortunately, today's methods of identifying communication devices on a network requires some type of manual programming by a trained administrator before the communication device can identify, or be identified by, other communication devices.

With computer systems, a Central Processor Unit (CPU) identifies peripheral devices that are connected to a system bus by using boot circuitry, such as a system Basic Input/Output Software (BIOS) chip. The BIOS chip contains BIOS logic that describes a memory with an array of memory addresses. When executed, the memory addresses are logical representations of peripheral interfaces on the system bus. The BIOS logic steps through each memory address and transfers an identification signal to each peripheral device represented by the memory addresses. The peripheral devices that are connected to the system bus send a response signal back to the BIOS logic. The BIOS logic receives the response signal from each peripheral device. The BIOS logic identifies the peripheral devices based on the response signals. The BIOS logic then loads the appropriate device logic for the peripheral devices found. The BIOS chip described above is well known to those skilled in the computer arts.

Unfortunately, the BIOS chip works only with a hard-wired system bus and has not been adapted to operate with network communication paths. A network communication path differs from a system bus in a number of ways. Transfers over a system bus mainly concern the physical media and link protocols. On the other hand, transfers over a network communication path concern network protocols in addition to the physical media and the link protocols. The physical media of a network communication path could be a wireless communication path wherein a system bus is generally a wire connection. The link protocol of a network communication path is generally a serial transfer protocol whereas a system bus generally uses a parallel transfer protocol. A network protocol used to transfer over a network communication path, such as Transmission Control Protocol (TCP), is not addressed when operating a system bus. Therefore, the current methods and systems for identifying peripheral devices on a system bus have not been effectively adapted to identify communication devices on a network.

SUMMARY OF THE INVENTION

The invention helps to solve the above problems with an identification system that implements boot circuitry to identify communication devices on a network. Advantageously, the boot circuitry is mature and available at a reasonable price. The identification system can advantageously be used in dissimilar communication devices to provide uniform identification of all the communication devices.

The identification system is comprised of the boot circuitry and an interface. The boot circuitry is configured to receive a request to identify communication devices on a network. The boot circuitry is configured to scan memory addresses. The memory addresses represent communication paths with the communication devices. The boot circuitry is configured to generate an identification signal for each memory address scanned. The boot circuitry is configured to transfer the identification signals to the interface.

The interface is configured to format each identification signal based on communication formats to generate formatted identification signals. The communication formats are based on the communication paths with the communication devices. The interface is configured to transfer the formatted identification signals to the communication devices based on the communication formats. The interface is configured to receive response signals back from the communication devices and transfer the response signals to the boot circuitry. The boot circuitry is configured to identify the communication devices based on the response signals. In some examples, the identification system is on an expansion card that is plugged into a communication device. In some examples, the boot circuitry comprises a conventional BIOS chip.

Figure 1:
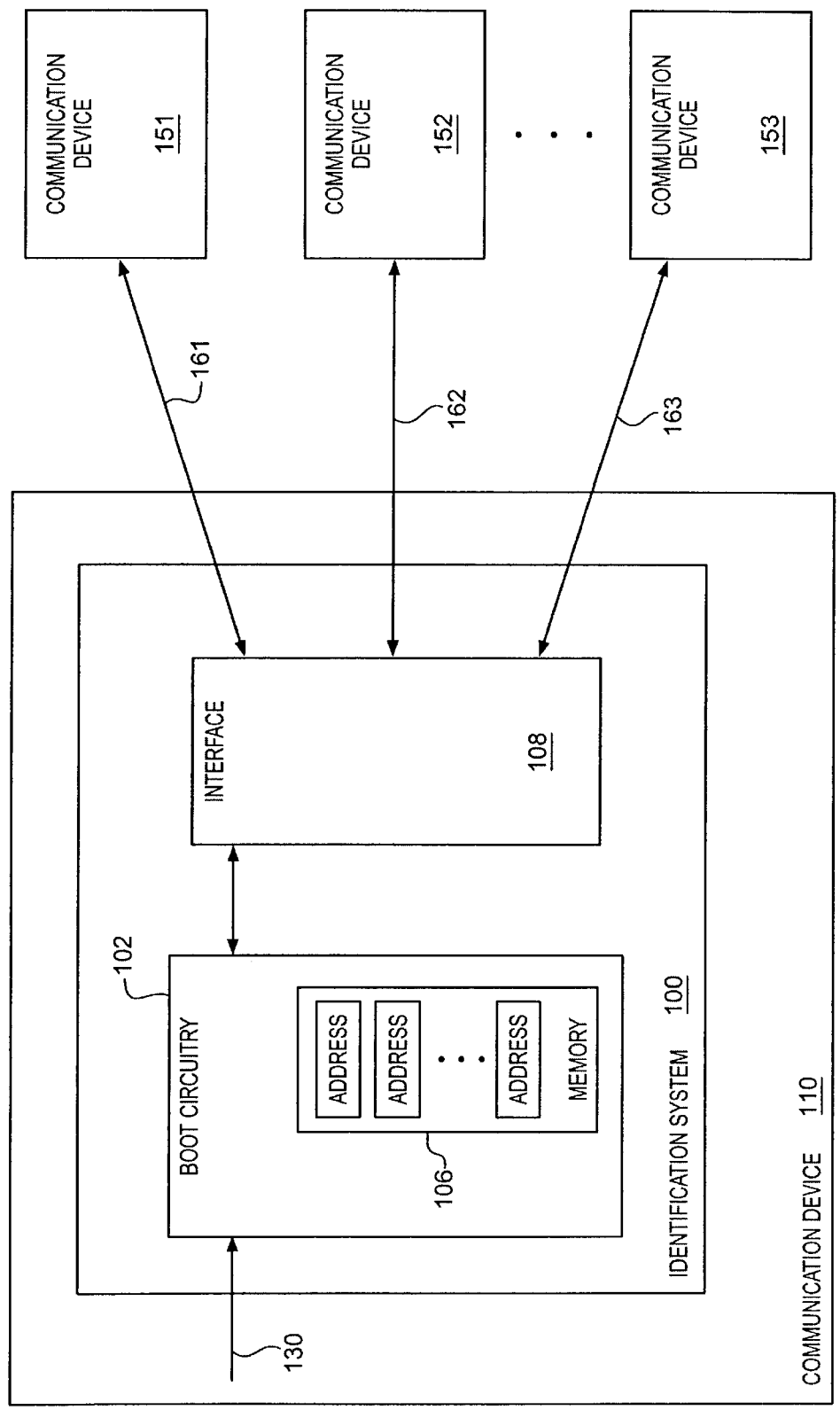
FIG. 1 is a block diagram that illustrates an identification system in an example of the invention.
Figure 2:
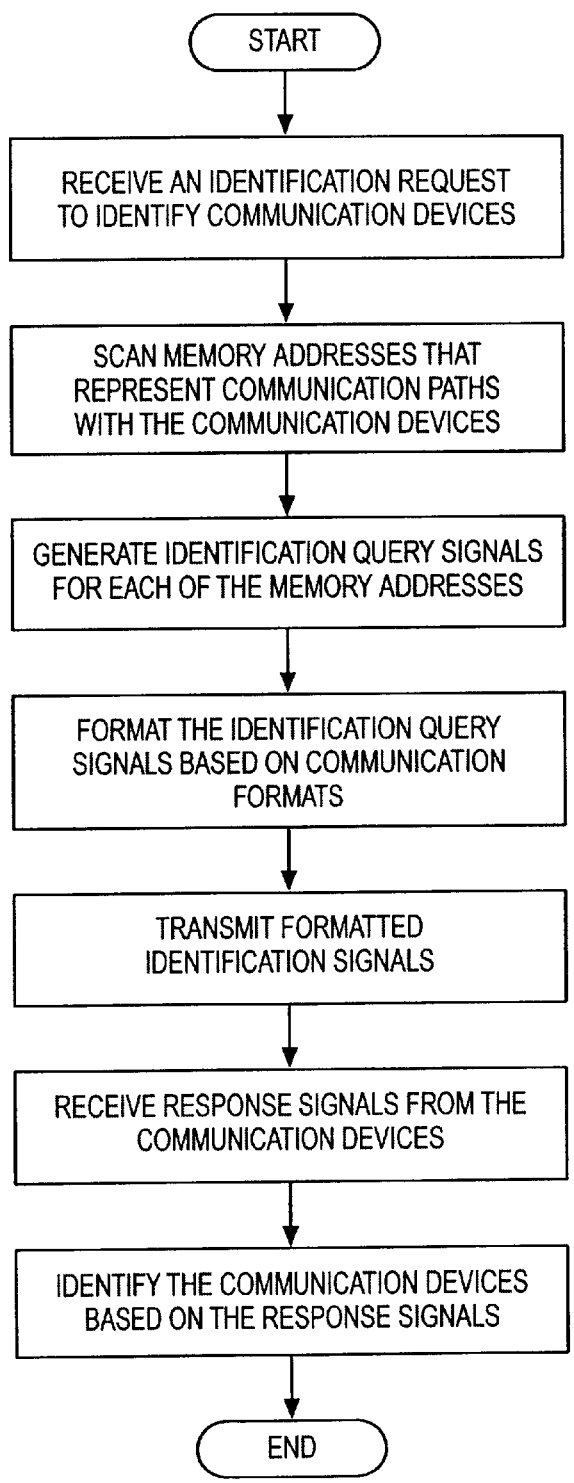
FIG. 2 is a flow diagram that illustrates an operation of an identification system in an example of the invention.

DETAILED DESCRIPTION OF THE INVENTION Identification System—FIGS. 1–2

FIGS. 1–2 depict an example of an identification system in accord with the present invention. Those skilled in the art will appreciate numerous variations from this example that do not depart from the scope of the invention. Those skilled in the art will also appreciate that various features described could be combined with other embodiments to form multiple variations of the invention. Those skilled in the art will appreciate that some conventional aspects of the identification system have been simplified or omitted for clarity.

FIG. 1 is a block diagram that illustrates an example of identification system 100 in accord with the invention. Identification system 100 is comprised of boot circuitry 102 coupled to interface 108. Boot circuitry 102 includes memory 106. Identification system 100 is configured to couple to communication device 110. Interface 108 is configured to communicate with communication device 151 over communication path 161 based on a first communication format. Interface 108 is configured to communicate with communication device 152 over communication path 162 based on a second communication format. Interface 108 is configured to communicate with communication device 153 over communication path 163 based on a third communication format. Those skilled in the art will appreciate that the first, second, and third communication formats could be the same formats or different formats. Examples of communication formats are Asynchronous Transfer Mode (ATM), Internet Protocol (IP), Transmission Control Protocol (TCP), User Datagramn Protocol (UDP), frame relay, T-1, and wireless.

FIG. 2 is a flow diagram that describes the operation of identification system 100 in an example of the invention. To start, boot circuitry 102 receives an identification request 130 to identify the communication devices 151–153 that are in communication with communication device 110. The communication devices 151–153 could be unknown to identification system 100. The identification request 130 could, for example, be generated at boot up of communication device 110. Boot circuitry 102 scans memory addresses in memory 106 in response to the identification request 130. The memory addresses represent communication paths 161–163 with communication devices 151–153. Boot circuitry 102 then generates an identification query signal for each of the memory addresses. Boot circuitry 102 transfers the identification query signals to interface 108.

Interface 108 formats the identification query signals based on the communication formats to generate formatted identification signals. The communication formats are based on the communication paths 161–163. Interface 108 transmits the formatted identification signals to the communication devices 151–153 over the communication paths 161–163, respectively, based on the communication formats.

Interface 108 receives response signals from the communication devices 151–153. Interface 108 de-formats the response signals and transfers the response signals to boot circuitry 102. Boot circuitry 102 identifies the communication devices 151–153 that are in communication with communication device 110 based on the response signals.

Figure 3:
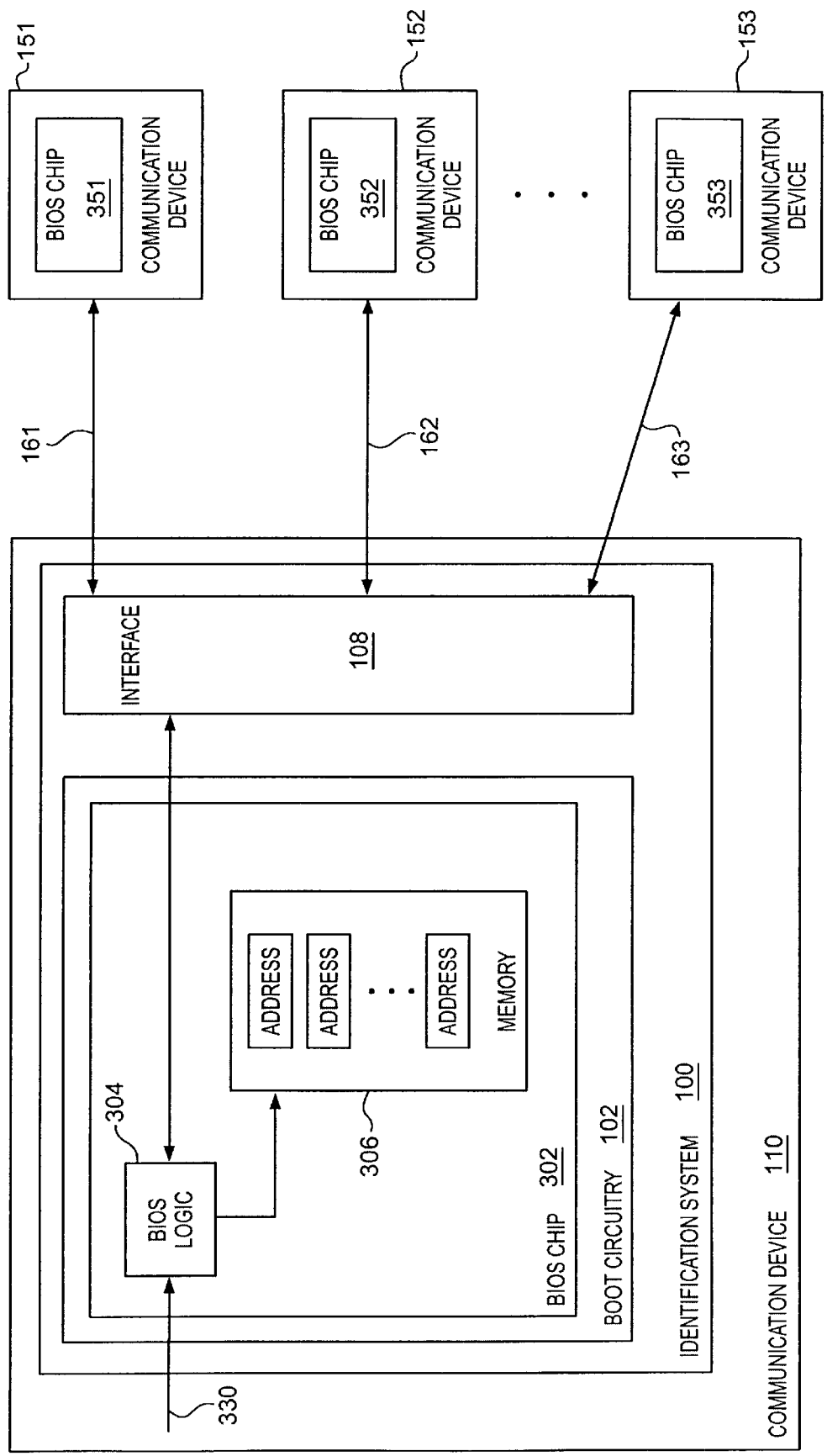
FIG. 3 is a block dram that illustrates an identification system using a conventional BIOS chip in an example of the invention.
Figure 4:
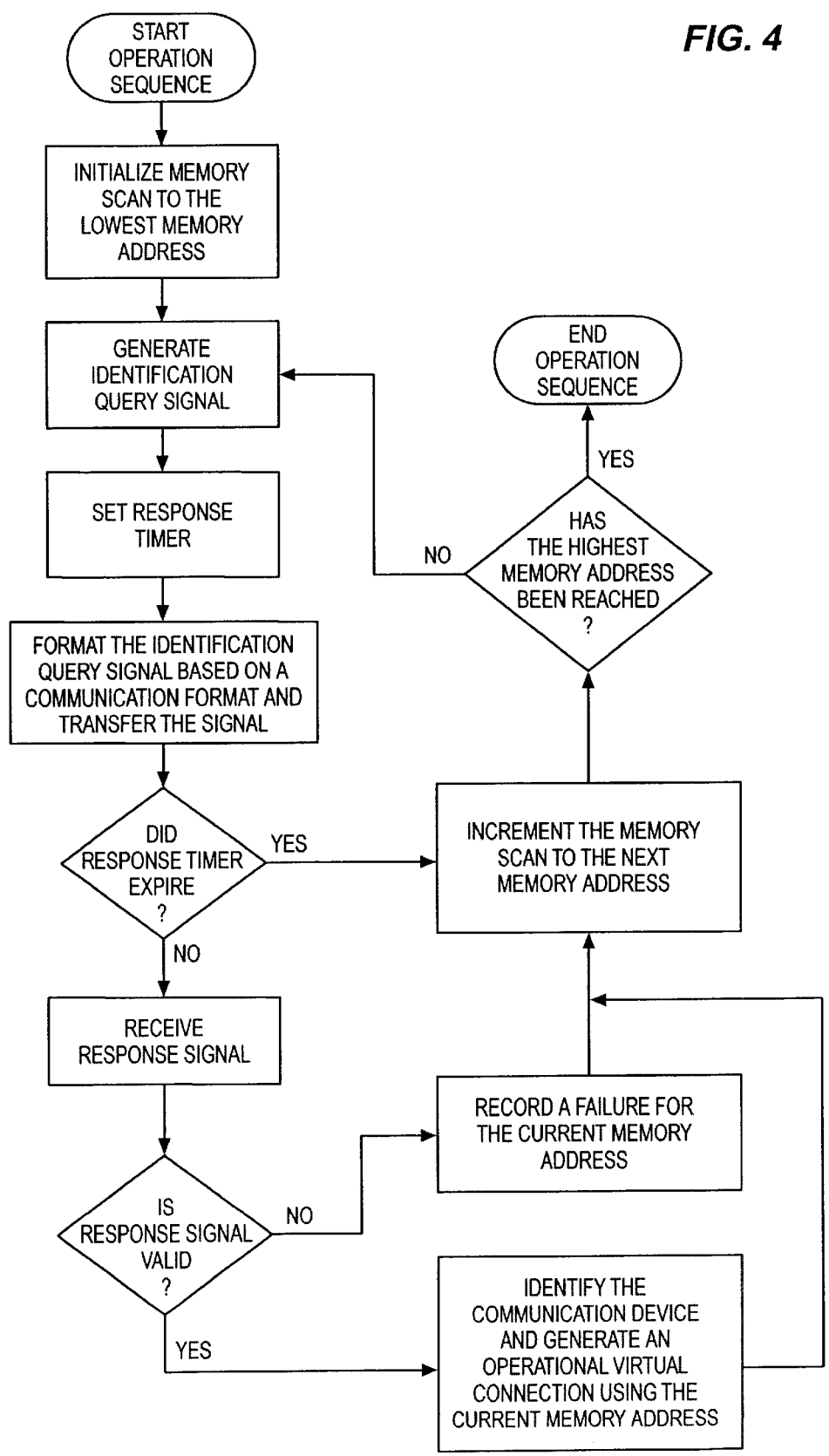
FIG. 4 is a flow diagram that illustrates an operation sequence for an identification system using a conventional BIOS chip in an example of the invention.

Identification System using a Conventional BIOS Chip—FIGS. 3–4

FIGS. 3–4 depict an example of an identification system using a BIOS chip in accord with the present invention. Those skilled in the art will appreciate numerous variations from this example that do not depart from the scope of the invention. Those skilled in the art will also appreciate that various features described could be combined with other embodiments to form multiple variations of the invention. Those skilled in the art will appreciate that some conventional aspects of the identification system have been simplified or omitted for clarity.

FIG. 3 is a block diagram that illustrates a second example of identification system 100. Identification system 100 in this example is comprised of boot circuitry 102 and interface 108. Boot circuitry 102 comprises Basic Input/Output Software (BIOS) chip 302. BIOS chip 302 is comprised of BIOS logic 304 and memory 306. BIOS logic 304 is coupled to memory 306 and interface 108. Interface 108 is configured to communicate with communication devices 151–153 over communication paths 161–163, respectively. Communication devices 151–153 comprise BIOS chips 351–353, respectively.

Identification system 100 is connected to an expansion card that is configured to plug into an expansion slot on communication device 110. Memory 306 contains an array of memory addresses that represent logical representations of communication devices 151–153. For instance, the first address in memory 306 represents a logical representation of communication device 151. Communication device 110 could be a network hub, such that communication device 110 and a plurality of other communication devices form a star pattern, with communication device 110 being the core.

In operation, communication device 110 generates an identification request 330 to identify the communication devices 151–153 that are in communication with communication device 110. Communication device 110 generates the identification request 330 automatically when it is powered up to initially identify the communication devices that are in communication with it. In such a case, communication devices 151–153 are initially unknown to communication device 110. Communication device 110 also periodically generates the identification request 330 to update communication device 110 as to the communication devices that are in communication with it. For example, communication device 110 could generate the identification request 330 every two minutes. That way, communication device 110 could quickly determine if a new communication device was in communication with it. Communication device 110 transfers the identification request 330 to BIOS logic 304. BIOS logic 304 initiates an operation sequence for identification system 100 based on the identification request 330.

FIG. 4 is a flow diagram that illustrates an example of the operation sequence for identification system 100. BIOS logic 304 initializes a memory scan and the memory scan finds, and points to, the lowest memory address in memory 306. The memory address, that the memory scan points to, is referred to herein as the current memory address. The current memory address is a logical representation of a communication device, which in this example is communication device 151. BIOS logic 304 generates an identification query signal and transfers the identification query signal to interface 108. BIOS logic 304 also sets a response timer.

Interface 108 receives the identification query signal. Interface 108 formats the identification query signal based on a communication format to generate a formatted identification signal. Interface 108 looks to the current memory address for the communication format to communicate with communication device 151. The current memory address points to a memory block that contains information on the communication format. The communication format is based on the communication path 161 that the formatted identification signal will be transmitted over. The communication format depends on the type of physical media of the communication path 161. For example, the physical media could be a fiber optic cable, a wire, a wireless link, or any other type of physical media that could be used in a network. The communication format also depends on the type of link protocol used to transfer the formatted identification signal. For example, the link protocol could be Ethernet protocol, Internet Protocol (IP), Asynchronous Transfer Mode (ATM) protocol, or frame relay protocol, in which case the communication format would include an address for the communication device 151. The link protocol could also be a wireless communication protocol wherein the communication format would include a frequency to communicate with the communication device 151. The communication format also depends on the type of network protocol used to transfer the formatted identification signal. For example, the network protocol could be a Transmission Control Protocol (TCP) or a User Datagram Protocol (UDP). After formatting the identification query signal, interface 108 transmits the formatted identification signal to the communication device 151.

BIOS logic 304 waits for interface 108 to receive a response signal within a time period designated by the response timer. If BIOS logic 304 does not receive the response signal through interface 108 within a time period, then BIOS logic 304 increments the memory scan and repeats the above steps for the next memory address. If BIOS logic 304 does receive the response signal through interface 108 within the time period, then BIOS logic 304 determines whether the response signal is valid.

If the response signal is not valid, then BIOS logic 304 records a failure with the current memory address. If the response signal is valid, then BIOS logic 304 identifies the communication device 151 based on the response signal. BIOS logic 304 then generates an operational virtual connection with the communication device 151 using the current memory address. Generating the operational virtual connection with the communication device 151 could involve loading interface information for the communication device 151. The method of identifying the communication device 151 and generating the operational virtual connection with the communication device 151 could be referred to as "registering" the communication device 151 with communication device 110. BIOS logic 304 then increments the memory scan and repeats the above steps on the next memory address. When the highest memory address has been reached in memory 306, BIOS logic 304 ends the operation sequence. When the operation sequence is over, all communication devices in communication with communication device 110 should be "registered" with communication device 110.

Communication devices 151–153 contain BIOS chips 351–353, respectively. BIOS chips 351–353 are the same peripheral card BIOS. When communication devices 151–153 receive the formatted identification signals from communication device 110, BIOS chips 351–353 recognize the formatted identification signals. BIOS chips 351–353 respond to the formatted identification signals with response signals. Therefore, communication devices 151–153 can be dissimilar devices and still respond in the same manner to communication device 110 by using similar BIOS chips.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of operating an identification system to identify communication devices, the method comprising:

receiving an identification request to identify the communication devices;

scanning memory addresses in response to the identification request wherein the memory addresses represent communication paths with the communication devices;

generating identification query signals for the memory addresses scanned;

formatting the identification query signals based on communication formats to generate formatted identification signals, wherein the communication formats are based on the communication paths;

transmitting the formatted identification signals over the communication paths to the communication devices based on the communication formats;

receiving response signals from the communication devices; and identifying the communication devices based on the response signals.

2. The method of claim 1 further comprising generating operational virtual connections with the communication devices based on the response signals.

3. The method of claim 1 wherein the identification system comprises an expansion card configured to plug into an expansion slot of a processor.

4. The method of claim 1 wherein a Basic Input/Output Software (BIOS) chip performs the steps of receiving the identification request to identify the communication devices, scanning the memory addresses in response to the identification request, generating the identification query signals for the memory addresses scanned, and identifying the communication devices based on the response signals.

5. The method of claim 1 wherein the communication formats comprise a frequency for a wireless communication.

6. The method of claim 1 wherein the communication formats comprise an Ethernet protocol.

7. The method of claim 1 wherein the communication formats comprise an Internet Protocol.

8. The method of claim 1 wherein the communication formats comprise an Asynchronous Transfer Mode (ATM) protocol.

9. The method of claim 1 wherein the communication formats comprise a frame relay protocol.

10. The method of claim 1 wherein the communication formats comprise a Transmission Control Protocol.

11. The method of claim 1 wherein the communication formats comprise a User Datagram Protocol.

12. An identification system configured to identify communication devices, comprising:

boot circuitry configured to receive an identification request to identify the communication devices, scan memory addresses in response to the identification request wherein the memory addresses represent communication paths with the communication devices, generate identification query signals for the memory addresses scanned, transfer the identification query signals, receive response signals, and identify the communication devices based on the response signals; and an interface coupled to the boot circuitry and configured to receive the identification query signals from the boot circuitry, format the identification query signals based on communication formats to generate formatted identification signals wherein the communication formats are based on the communication paths, transmit the formatted identification signals over the communication paths to the communication devices based on the communication formats, receive the response signals from the communication devices, and transfer the response signals to the boot circuitry.

13. The identification system of claim 12 wherein the boot circuitry is further configured to generate operational virtual connections with the communication devices based on the response signals.

14. The identification system of claim 12 wherein the identification system comprises an expansion card configured to plug into an expansion slot of a processor.

15. The identification system of claim 12 wherein the boot circuitry comprises a Basic Input/Output Software (BIOS) chip.

16. The identification system of claim 12 wherein the communication formats comprise a frequency for a wireless communication.

17. The identification system of claim 12 wherein the communication formats comprise an Ethernet protocol.

18. The identification system of claim 12 wherein the communication formats comprise an Internet Protocol.

19. The identification system of claim 12 wherein the communication formats comprise an Asynchronous Transfer Mode (ATM) protocol.

20. The identification system of claim 12 wherein the communication formats comprise a frame relay protocol.

21. The identification system of claim 12 wherein the communication formats comprise a Transmission Control Protocol.

22. The identification system of claim 12 wherein the communication formats comprise a User Datagram Protocol.

* * * * *